United States Patent
Li

(10) Patent No.: US 8,798,250 B1
(45) Date of Patent: Aug. 5, 2014

(54) AUTOCORRECT FOR PHONE NUMBERS

(71) Applicant: Research In Motion Limited, Waterloo (CA)

(72) Inventor: Haobin Li, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/764,715

(22) Filed: Feb. 11, 2013

(51) Int. Cl.
*H04M 1/275* (2006.01)
*H04M 3/44* (2006.01)

(52) U.S. Cl.
USPC ............ 379/201.01; 379/207.02; 379/216.01; 379/218.01; 379/355.01; 379/355.05; 379/355.09

(58) Field of Classification Search
USPC ............ 379/216.01, 218.01, 201.01, 207.02, 379/355.01–357.05
See application file for complete search history.

(56) References Cited

U.S. PATENT DOCUMENTS

| | | | |
|---|---|---|---|
| 5,339,357 A | 8/1994 | Sawamura et al. | |
| 5,592,546 A | 1/1997 | Takahashi | |
| 6,097,808 A | 8/2000 | Hyun-Soon | |
| 7,085,369 B2 * | 8/2006 | Wang | 379/355.02 |
| 8,514,180 B2 * | 8/2013 | Sosby et al. | 345/169 |
| 2003/0174833 A1 * | 9/2003 | Wang | 379/419 |
| 2004/0205530 A1 | 10/2004 | Borg | |
| 2008/0126075 A1 | 5/2008 | Thorn | |
| 2012/0212422 A1 | 8/2012 | Fang | |
| 2013/0009877 A1 | 1/2013 | Sosby | |

FOREIGN PATENT DOCUMENTS

| | | |
|---|---|---|
| WO | 9951008 A1 | 10/1999 |
| WO | 2012050549 A1 | 4/2012 |

OTHER PUBLICATIONS

Extended European Search report mailed Jul. 18, 2013, in corresponding European patent application No. 13154845.5.
StarHome Intelligent Call Assistant; www.starhome.com/call-completion.html; retrieved on Dec. 4, 2012.
Moreno, Juan et al.; "A Telephone Number Corrector Using a Counterpropagation Network"; http://www.dsi.uclm.es/personal/AntonioFdez/nais/nais/investigacion/publicaciones/congresos_1998/ICONIP98-telephone.pdf; 1998; retrieved on Dec. 4, 2012.
StarHome Outbound ICA Camel; www.starhome.com/outbound-ica-camel.html; retrieved on Dec. 4, 2012.

* cited by examiner

*Primary Examiner* — Harry S Hong
(74) *Attorney, Agent, or Firm* — Novak Druce Connolly Bove + Quigg LLP

(57) ABSTRACT

A system and method are provided for automatic correction of numeric input, such as telephone numbers. The communications device configured to perform automatic correction can receive a numeric input string indicating a numerical address with which to initiate a communication, and compare the numeric input string to a database of known valid numerical addresses. Then, upon determining that the numeric input string has no match within the database of known valid numerical addresses, the communications device can identify a known valid numerical address that is within a threshold similarity to the numeric input string, and correct the numeric input string. The communications device can initiate communication using the corrected numeric input string. Also set forth herein are a system and method for automatic completion of partially entered numerical addresses.

20 Claims, 6 Drawing Sheets

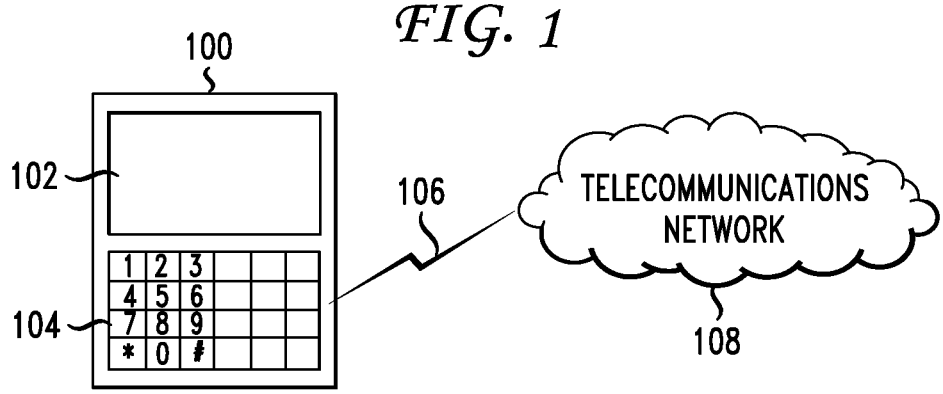
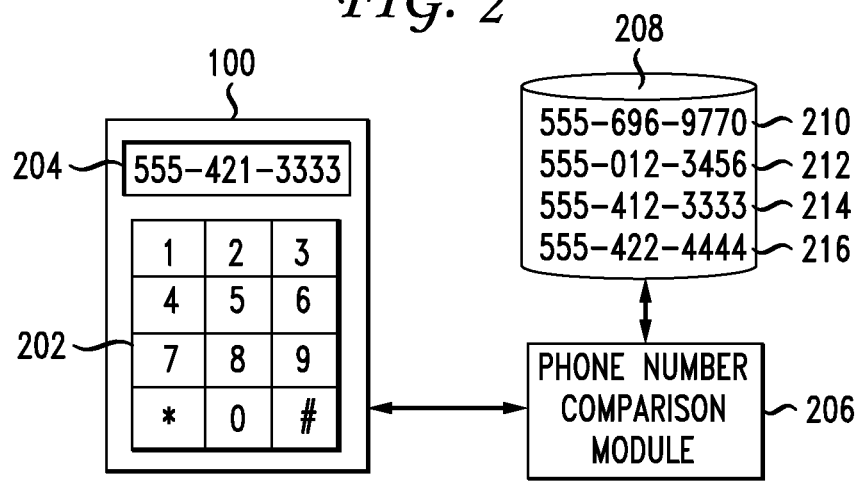

AUTOCORRECT FOR PHONE NUMBERS

FIELD OF TECHNOLOGY

The present disclosure relates generally to telephone input, and more specifically to a system and method for autocorrecting mistyped telephone numbers in a telephony device.

BACKGROUND

Communications devices, such as cellular phones, smart phones, desk-top phones, and tablets, allow users to dial numbers to place phone calls or enter device addresses to initiate communications. For example, a user can enter a telephone number using physical keys on a cellular phone to place a phone call. Alternatively, a user can enter a destination address using a virtual on-screen keyboard to send a short messaging service (SMS) message on a tablet computing device. However, while operating under the physical constraints of a mobile device, a user may inadvertently enter an incorrect telephone number, thereby calling the wrong person. Even for non-mobile devices, such as a desk phone, a user may accidentally dial a wrong number, or transpose two digits of a phone number. Mistyped phone numbers can lead to wasted cell phone minutes, wasted time, and socially awkward exchanges. Further, in an enterprise scenario, potentially sensitive or confidential information could be sent to the wrong person.

BRIEF DESCRIPTION OF THE DRAWINGS

A description is provided herein with reference to specific examples illustrated in the appended drawings. These drawings depict only example implementations of the disclosure and are not intended to limit the scope of the disclosure.

FIG. 1 shows a communications device according to one example;

FIG. 2 shows a system for correcting a dialed number according to one example;

DETAILED DESCRIPTION

Figure 3:
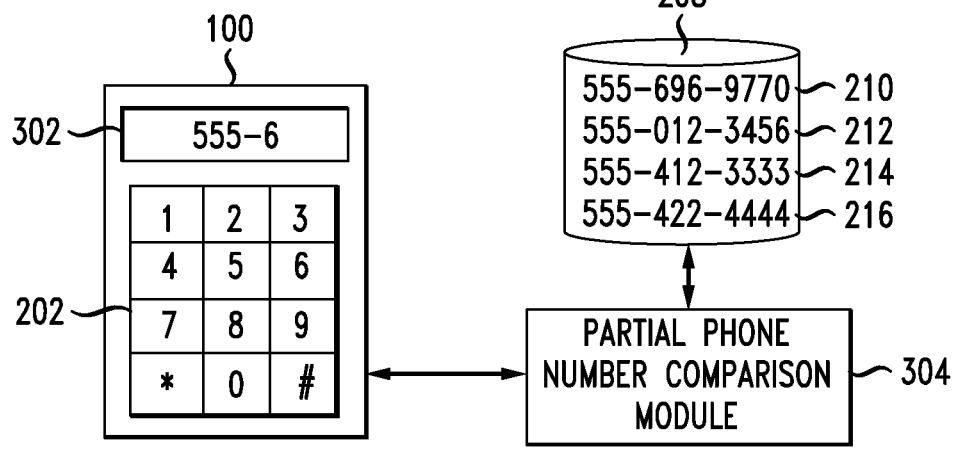
FIG. 3 shows a system for automatically completing of partially dialed number according to one example.

Various examples of correcting mistyped or partially entered numerical addresses, such as telephone numbers or the like, are provided herein. While specific examples are discussed, it should be understood that this is for illustration purposes only. A person skilled in the relevant art will recognize that other components and configurations may be used without departing from the spirit of the disclosure.

Several definitions that apply throughout this document are now presented. The phrase "coupled" is defined as connected, whether directly or indirectly through intervening components, and is not necessarily limited to physical connections. Coupled devices are devices that are in signal communication with one another.

The term "electronic device" is defined as any device that is capable of at least accepting data, transmitting data, and executing commands. For example, electronic devices may include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of one or more of accepting data, transmitting data, and executing commands.

Systems and methods are provided for correcting and/or predicting numeric input entered into a communication device, such as numbers entered via a keypad on a cellular phone. In one implementation, a communications device includes a processor executing an algorithm that can be implemented as software code to compare a dialed number or a number typed into an address field, with numbers in an address book or a communication log associated with the communication device. If a number is not stored in a database, but is sufficiently similar to a number stored in the database, the communication device can take some appropriate action. The database may include data sources such as an address book, a communication log, or the like. The communication device can determine sufficient similarity based on a similarity threshold, similarity templates, similarity rules, or the like. Some example appropriate actions include warning the user about the potential mis-entry, automatically correcting a potential mis-entry, providing a suggested alternative number, or the like. The communication device can prompt the user with "You dialed 519-888-7456. Did you mean 519-888-7465?" In this manner, the communication device can recognize and correct misdialed numbers. Alternatively, the communications device can complete partially dialed numbers.

When the user enters a number that is a sufficiently close, but different from a known number stored in the database, the communication device can choose to perform an action associated with the known number. For example, if the known number is a commonly dialed number, then the communication device can automatically correct the mis-entered number. If the known number is in a call history, but rarely dialed, the communication device can suggest the known number and optionally provide some additional information about the last time or times the known number was dialed. The additional information may be used to refresh the memory of the user. If the known number only has been dialed once over long time period, then the communication device may not perform any action and may allow the user to continue with the unrecognized number, without performing any updates or providing any suggestions. Further, the user can specify particular actions to perform for specific mis-entered numbers, or for specific known numbers.

The communication device can keep records in connection with a functionality of initiating communications such as phone calls or text messages. For example, the records can include a communication log, a call log, or the like. The communications device can use the communication log, and optionally other sources, as a "dictionary" for checking phone numbers. Algorithms for checking phone numbers are different from algorithms for checking text spelling because checking text spelling can be more tolerant to false positives. By contrast, checking phone numbers can be tuned toward a goal of zero false positives, even if that means allowing some false negatives. Stricter phone number checking can be desirable because if the communication device tries to correct a mis-entered number dialed by the user, and the communications device is wrong, the user can become frustrated and incur connection fees.

In a related embodiment, the communication device can automatically complete user input that is partially entered such as a telephone number in which only 5 digits have been entered. The communication device can perform the automatic completion independently of the automatic correction. Alternatively, the communication device can perform the automatic completion simultaneously with the automatic correction. One of ordinary skill in the art will appreciate that the communication device can perform some other arrangement for automatic completion and automatic correction. The communication device can receive a partial numeric input string indicating a portion of a numerical address with which to initiate a communication. The partial numeric input string can be compared database entries of known valid numerical addresses. Then the communication device can identify a known valid numerical address having a first portion that is within a threshold similarity to the partial numeric input string. Upon determining that no other known valid numerical addresses are within the threshold similarity to the partial numeric input string, the communication device can initiate a communication using the known valid numerical address.

FIG. 1 shows an example communications device 100. The example communications device 100 may be a portable communication device, a mobile communication device, a mobile computer, a smartphone, a computing pad, a tablet computer, a personal computer, a desktop computer, a laptop computer, a netbook, a set-top phone, a portable digital assistant (PDA), or other electronic device capable of at least accepting data, transmitting data, and executing commands. The example communications device 100 can include a non-transitory or a transitory computer-readable storage medium that can be internal, external, portable, or detachable. For example, the computer-readable storage medium may be any available media that may be accessed by a general purpose or special purpose computer, including the functional design of any special purpose processor. By way of example, and not limitation, such non-transitory computer-readable media may include RAM, ROM, EEPROM, CD-ROM or other optical disk storage, magnetic disk storage or other magnetic storage devices, flash memory, or any other medium which may be used to carry or store desired program code in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium.

According to one example, the communications device 100 may be a smartphone and may include at least one processor configured to execute instructions for processing, comparing, and correcting entered numerical input, such as a dialed telephone number. The communications device 100 may include a display 102, a numeric input device 104 such as a keyboard, and a network interface 106 with a telecommunications or other type of network 108. As the user inputs data via the numeric input device 104, the communications device 100 can initiate some communication, such as placing a telephone call, transmitting a fax, sending a text message, or the like.

FIG. 2 shows an example of correcting a mis-entered number for the communications device 100 having a graphical user interface 200. The graphical user interface 200 can include a dial pad 202 for receiving numeric input from a user, such as via a touch screen. The graphical user interface 200 can also include a number field 204 that displays the numeric input from the user as the communications device 100 receives the input. The communications device 100 processes the numeric input via a phone number comparison module 206 that compares the numeric input to a database 208 of numbers 210, 212, 214, 216. The phone number comparison module 206 can be incorporated as part of the communications device 100, or can be external to the communications device 100, such as a network-accessible service or a communication gateway that intercepts and forwards communication requests. The database 208 can include a log of placed or received calls. as Additionally, the database 208 can include telephone numbers from an address book or contact list, or a list of telephone numbers extracted from the text of email messages or other communications. The database 208 can act as a dictionary of expected phone numbers. The database 208 can be local to the communications device 100 or remote, such as stored on a network server.

When the communications device 100 receives a dialed number that is in the database, the communications device 100 does not need to perform any additional checking, notifying, or correcting to the dialed number. If, however, the dialed number is not in the database 208, the phone number comparison module 206 can attempt to identify a number in the database 208 that is within a certain similarity threshold to the dialed number. If no number in the database 208 is within the similarity threshold to the dialed number, the system can leave the dialed number unchanged. In this case, the system may generate a prompt or other notification to the user indicating that the dialed number is unrecognized and may be incorrect.

The similarity threshold can be based on a similarity using a minimum number of matching digits, a particular pattern of transposed digits, an extra digit, a missing digit, proximity of keys pressed by the user, and so forth. For example, a similarity threshold based on a minimum number of matching digits, the phone number comparison module 206 can identify a number in the database 208 that has no more than 2 digits difference. In a similarity threshold based on a particular pattern of transposed digits, the phone number comparison module 206 can perform an analysis of commonly transposed digits to identify corresponding numbers in the database 208. For example, the phone number comparison module 206 can identify 555-123-4664 as within the similarity threshold for 555-123-6446. In this case, a human user could forget which number comes first in the final set of digits, and transpose the two numbers in the same pattern. The phone number comparison module 206 can compensate for missed key presses or extra key presses.

For example, the phone number comparison module 206 can render on a display for user selection one or more phone numbers that correspond to the inputted numerical string having the extra or missing digits. For example, the system may analyze a proximity of a key position that corresponds to a potential extra digit relative to a key position of another key that was pressed for a desired digit. For example, if the user intended to press the key corresponding to digit 9 on a phone dial pad, the user also may have accidentally pressed the key corresponding to the digit 6. Since the position of the key corresponding to the digit 6 is adjacent to the key corresponding to the digit 9, the system may determine that entry of digit 6 is an unintentional extra digit. Conversely, an extra number 1 rendered on the display adjacent to a number 9 is not a strong indicator of an accidental or unintentional extra digit since the position of the key corresponding to the digit 1 is not located adjacent to the key corresponding to the digit 9.

In another example, the key arrangement for a keypad provided on a computer keyboard differs from the key arrangement on a dial pad of a telephone. For example, on a computer keyboard, the upper row of the keypad is 7, 8, 9, the middle row is 4, 5, 6, and the bottom row is 1, 2, 3, whereas on a telephone dial pad the upper row is 1, 2, 3, the middle row is 4, 5, 6, and the bottom row is 7, 8, 9. A user that is not paying close attention may inadvertently dial a number using the wrong key arrangement or layout. A phone number stored in the database 208 associated with the telephone may be similar to a dialed number if the user, not thinking, instinctively dials a number in an inverted fashion, leading to a completely foreign number that has a strong correspondence that is only detectible based on an inverted key pad layout. The patterns for recognizing numbers from the database 208 can adapt to a particular user's typing style and personal idiosyncrasies as the user misdials and selects corrections.

In this specific example, the user enters the number 555-421-3333, as shown in number field 204. That number is not in the database 208, but the phone number comparison module 206 can recognize that an entry 214 in the database 208 is within the similarity threshold. The communications device 100 can replace the dialed number with the entry 214, and optionally notify the user of the change. Then the communications device 100 can place the telephone call. The communications device 100 can evaluate the entered numeric input upon the user clicking a dial button. Alternatively, the communications device 100 can evaluate the entered numeric input progressively as numbers are entered. Still further, the communications device 100 can evaluate the entered numeric input when a certain minimum number of digits are entered. If the communications device 100 detects multiple potential phone numbers within the similarity threshold, the communications device can automatically select a number with a highest similarity score, select a most-frequently-dialed number from the multiple numbers, wait for additional input from the user, or prompt the user to disambiguate between the multiple numbers that fall within the similarity threshold.

In one implementation, the communications device 100 can also include a database of numbers that are explicitly marked as mistakes. If a dialed number matches one of the mistaken numbers, the communications device 100 can force a selection of a closest match from the database 208, force the user to redial, or can automatically dial a proper number associated with the mistaken number.

Further, in an enterprise scenario, the enterprise may prevent employees from sending potentially sensitive or confidential information to an unauthorized destination. The enterprise can impose a set of restrictions, such as a group policy, for communication devices to require dialed numbers to match a number in the database 208 based on location, actual or expected communication content, type of communication, the type or identity of the recipient, and so forth.

After the communications device 100 alters a dialed number, the user may realize that the original, unaltered number was correct. In these situations, the communications device 100 can provide a mechanism, such as a touch-screen input, a keyboard input, a gesture, a voice command, or the like, to allow the user to undo the autocorrect and revert to the original number as dialed. Further, the user can enter some combination of key strokes, or provide some other input, prior to dialing that indicates to the communications device 100 to disable the autocorrect mechanism for this number, for example.

FIG. 3 shows an example of automatic completion of a partial dialed number. This example is similar to is the example shown in FIG. 2, but only 4 digits are entered in the number field 302 compared to the entire 10 digits in the number field 204 of FIG. 2. In this example, the communications device 100 can progressively scan the numbers entered to find a match, via a partial phone number comparison module 304. The partial phone number comparison module 304 can wait for some minimum number of digits before checking for matches. For example, the partial phone number comparison module 304 can wait until at least 4 digits are entered before making any comparison to numbers in the database 208. In this example, only one number 210 in the database 208 matches the partially dialed number shown in number field 302. Thus, when the number of matches in the database 208 is down to one, the system can automatically complete the partially dialed number. Alternatively, the system can prompt the user to accept or confirm the matching number 210 from the database 208 to place the telephone call.

Figure 4:
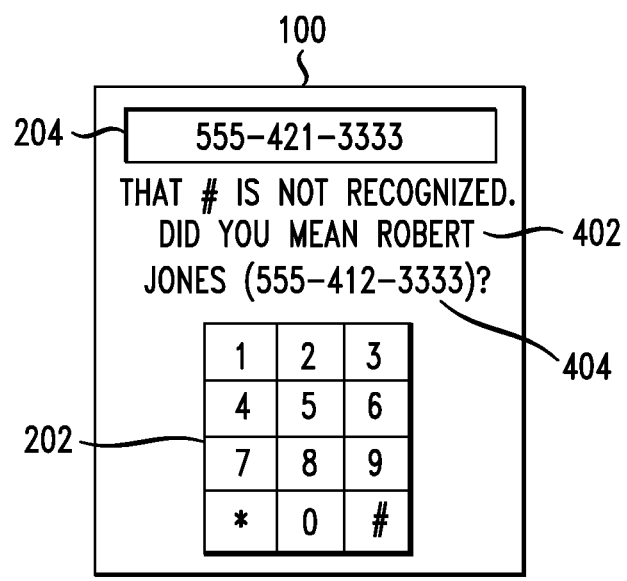
FIG. 4 shows a confirmation dialog for correcting a dialed number according to one example.

FIG. 4 shows an example confirmation dialog for correcting a dialed number. In the example of FIG. 2, the user entered the number 555-421-3333 via the keypad 202, as shown in the number field 204. The phone number comparison module 206 identified a number 214 from the database 208 within the similarity threshold. The communications device 100 can generate and display to the user a prompt 402 indicating that the dialed number is not recognized, and provide information describing the number within the similarity threshold. The communications device 100 can provide a clickable confirmation 404. Alternatively, the communications device 100 can receive some input from the user indicating a desire to instead dial the number 214 from the database 208. Then the communications device 100 can dial the number 214 from the database 208 instead of what the user actually entered via the keypad 202.

Figure 5:
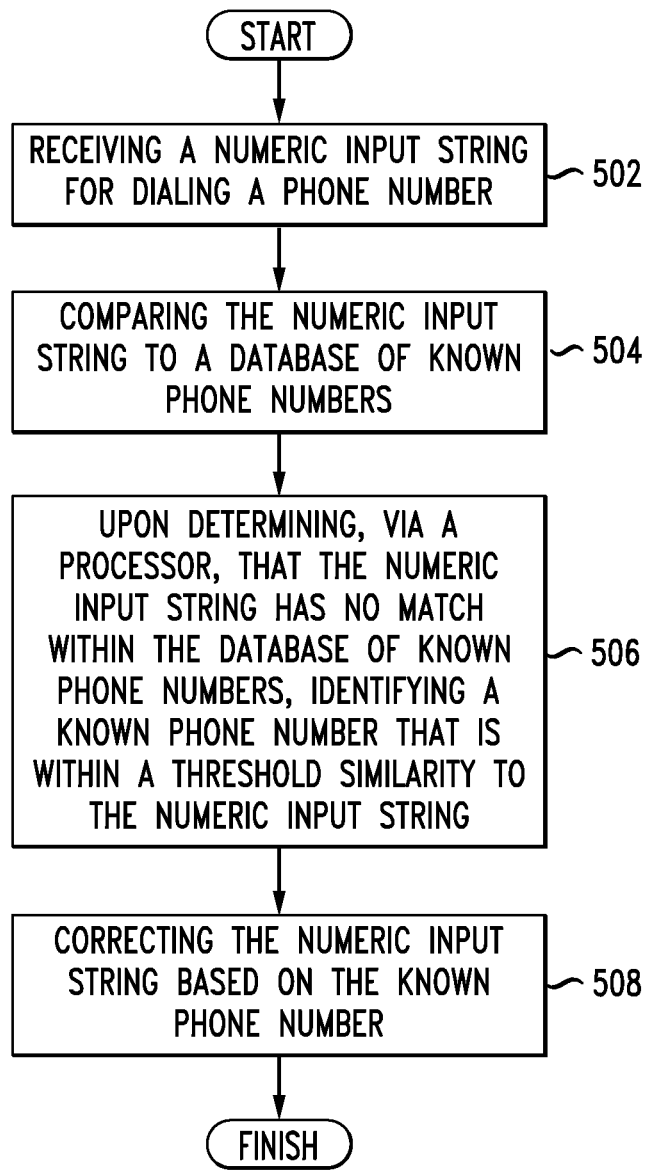
FIG. 5 shows an example process for automatically correcting a numeric entry while dialing a phone number.
Figure 6:
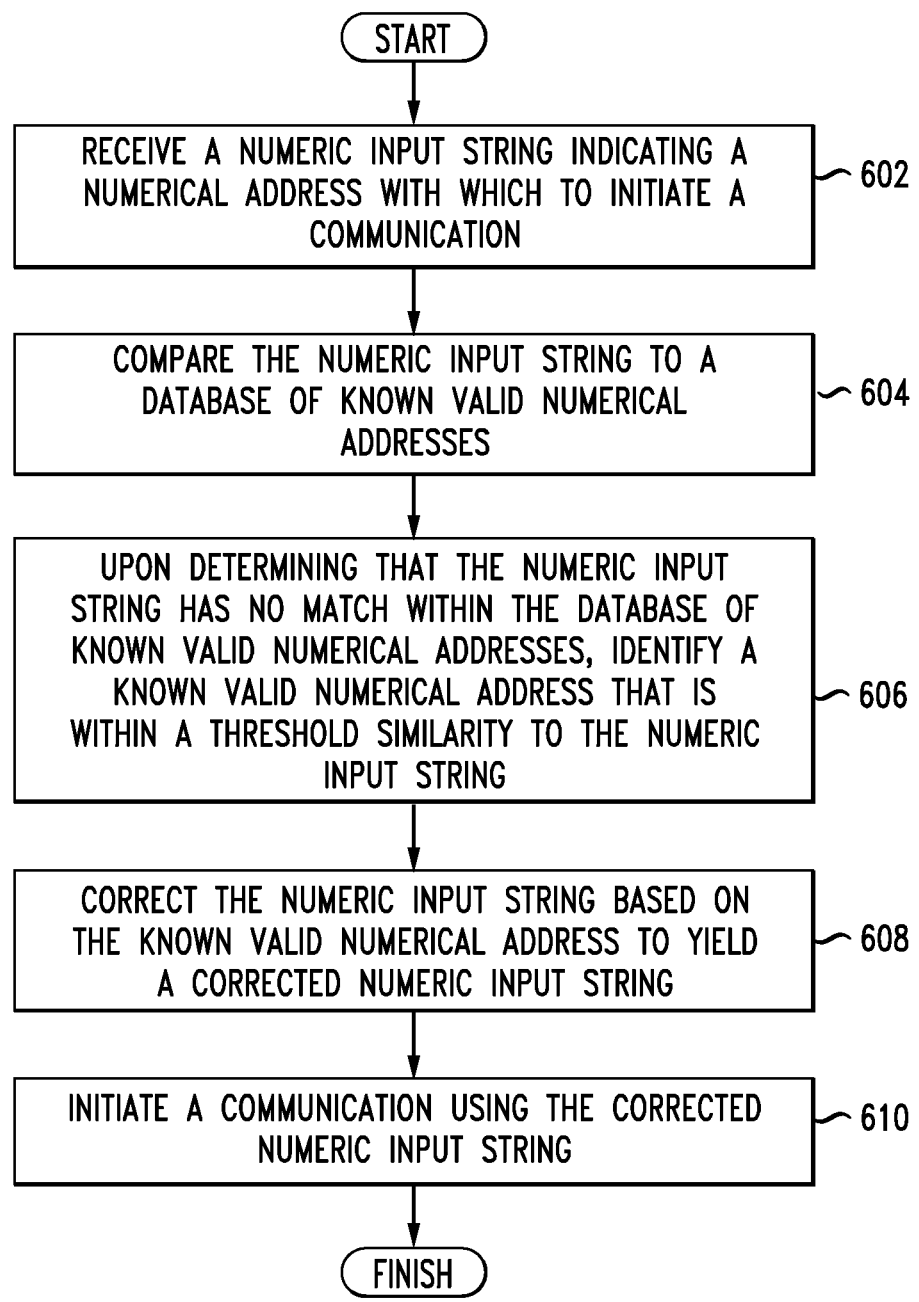
FIG. 6 shows an example process for automatically correcting a numeric entry while entering a numerical address for a communication.
Figure 7:
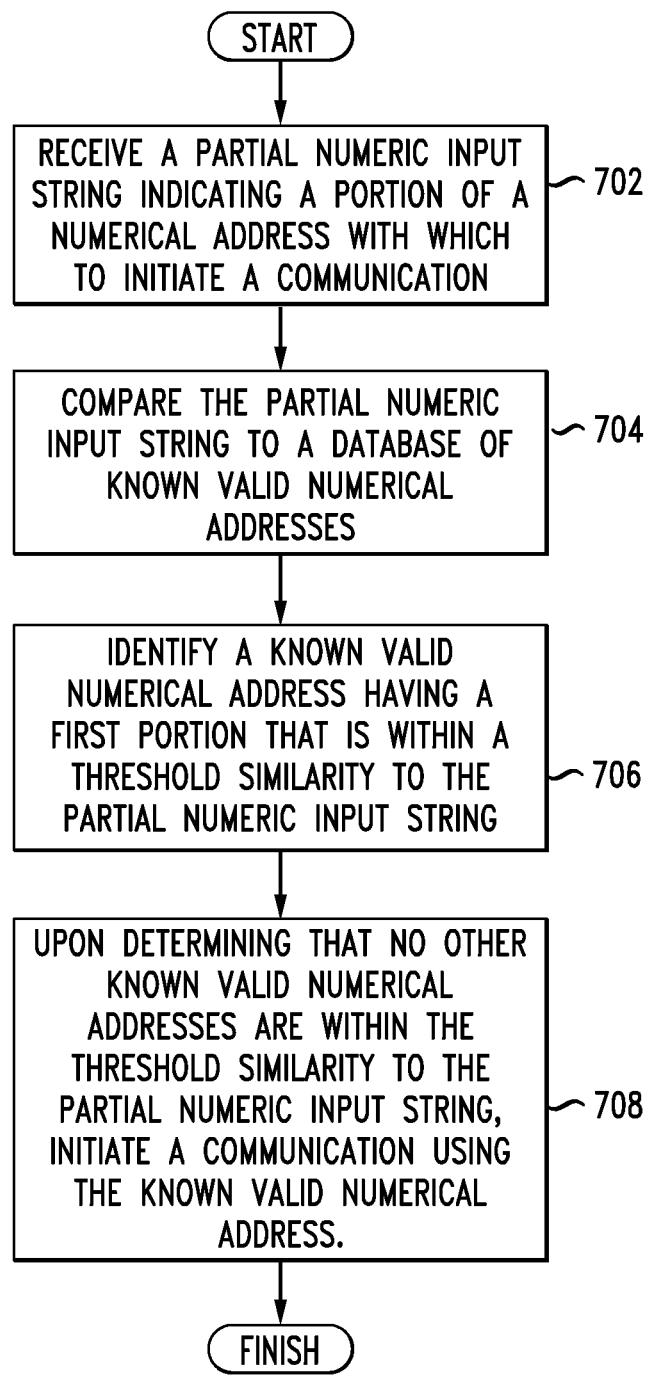
FIG. 7 shows an example process for automatically completing a partially dialed number using a database of known numbers.

Various examples of methods and systems for automatic correction or automatic completion of numeric inputs are described with reference to FIGS. 5-7. While FIGS. 5-7 illustrate a particular order of steps, one of ordinary skill in the art will appreciate that the steps may be executed in any order to accomplish the technical advantages of the present disclosure and may include fewer or more steps than illustrated, may modify the illustrated steps, or may perform any or all of the steps in different orders than the order illustrated. Each block represents one or more processes, methods, or subroutines. The steps may be implemented in a system such as an electronic device, a server, a media streaming device, smartphone, electronic tablet, stereo system, automobile stereo or any other type of electronic device capable of at least accepting data, transmitting data, and executing commands. Each block shown in FIGS. 5-7 may be carried out by a processor 820 of the electronic device 100. The processor 820 illustrated in FIG. 8 may include one or more processors or one or more processing systems. The flow charts illustrated in FIGS. 5-7 will be described with reference to the communications device 100 shown in FIG. 8. While the principles are discussed primarily in terms of placing a telephone call, the same principles can be applied to numeric inputs other than dialing a telephone number.

FIG. 5 shows an example process for automatic correction while dialing a phone number. The communications device 100 configured to practice the process can receive a numeric input string for dialing a phone number 502. The communications device 100 can receive the numeric input string via a physical keyboard, a virtual on-screen keyboard, voice input, a stylus, other input mechanism, or any combination thereof. The communications device 100 can compare the numeric input string to a database of known phone numbers 504. The communications device 100 can compare the numeric input string to the database of known phone numbers upon complete entry of the numeric input string, as the numeric input string is entered, or when a minimum quantity of digits are entered. The database of known phone numbers can include an address book, a call log, a conversation history, a communication log, or the like.

Upon determining that the numeric input string has no match within the database of known phone numbers, the communications device 100 can identify a known phone number that is within a threshold similarity to the numeric input string 506. This threshold similarity can be based on at least one of number transposition, common typographical errors, a mistake history, or a keyboard layout. The communications device 100 can correct the numeric input string to correspond to the known phone number 508. However, prior to correcting the numeric input string, the communications device 100 can optionally prompt a user to confirm the known phone number, and receive from the user a confirmation of the known phone number. The communications device 100 can optionally initiate a communication, such as placing a telephone call, using the known phone number. Alternatively, the communications device 100 can initiate communication using the corrected numeric input string after correcting the numeric input string to yield a corrected numeric input string.

FIG. 6 shows an example process for automatic correction while entering a numerical address for a communication. This provides a more generic perspective on communications other than telephone calls. A communications device 100 configured to practice this process by receiving a numeric input string indicating a numerical address with which to initiate a communication 602. The communications device 100 can compare the numeric input string to a database of known valid numerical addresses 604.

Upon determining that the numeric input string has no match within the database of known valid numerical addresses, the communications device 100 can identify a known valid numerical address that is within a threshold similarity to the numeric input string 606. For example, the communications device 100 can determine that the numeric input string is absent from a call history log. Alternatively, the communications device 100 can determine that the numeric input string is present the call history log, but indicated as a mistake.

The communications device 100 can correct the numeric input string based on the known valid numerical address to yield a corrected numeric input string 608. The communications device 100 can initiate a communication using the corrected numeric input string 610. The communications device 100 can optionally prompt a user to confirm the known valid numerical address, and receive from the user a confirmation of the known numerical address prior to initiating the communication. In another variation, upon determining that only one known valid numerical address is within the threshold similarity, the communications device 100 can correct the numeric input string based on the one known valid numerical address without additional user interaction.

FIG. 7 shows an example process for automatic completion of a partially dialed number based on a database of known numbers. The communications device 100 can receive a partial numeric input string indicating a portion of a numerical address with which to initiate a communication 702. Before processing the partial numeric input string, the communications device 100 can ensure that a minimum number of digits have been entered. The communications device 100 can compare the partial numeric input string to a database of known valid numerical addresses 704. The database of known valid numerical addresses can be an address book, a communication log, data extracted from available communications, or the like.

The communications device 100 can identify a known valid numerical address having a first portion that is within a threshold similarity to the partial numeric input string 706. The communications device 100 can optionally generate an indication that the known valid numerical address has been identified, such as a visible, audible, or other notification.

Upon determining that no other known valid numerical addresses are within the threshold similarity to the partial numeric input string, the communications device 100 can initiate a communication using the known valid numerical address 708. For example, the communications device 100 can place a telephone call, connect to a network address, send a short messaging service (SMS) message, or the like. In one variation, the communications device 100 can present to a user a dialog to confirm the known valid numerical address and only initiate the communication upon receiving a confirmation via the dialog.

Figure 8:
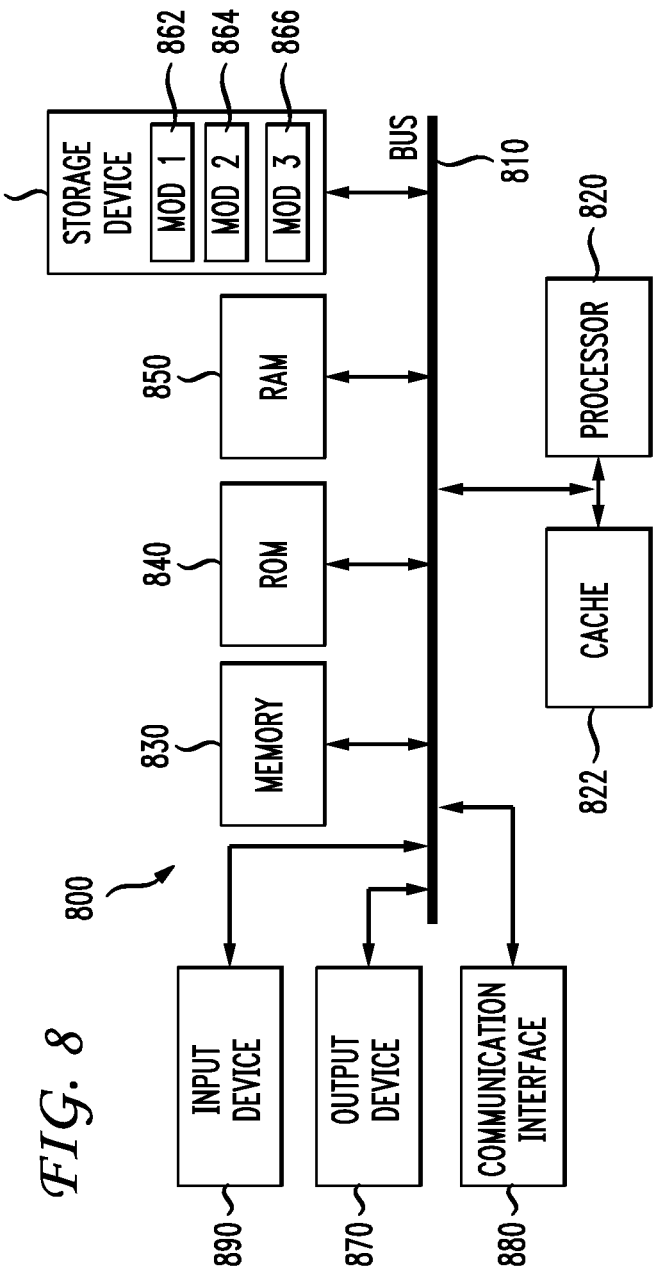
FIG. 8 illustrates a computing device system according to an example implementation.

The disclosure now turns to a brief description of a basic general purpose system or computing device, as shown in FIG. 8, which may be employed to practice the concepts disclosed herein. The components disclosed herein may be incorporated in whole or in part into handsets, transmitters, servers, and/or any other electronic or other computing device.

With reference to FIG. 8, an example system 100 includes a general-purpose computing device 100 or electronic device; including a processing unit (CPU or processor) 820 and a system bus 810 that couples various system components to the processor 820. The system components include a system memory 830 such as read only memory (ROM) 840 and random access memory (RAM) 850. The system 100 may include a cache 822 of high speed memory connected directly with, in close proximity to, or integrated as part of the processor 820. The system 100 copies data from the memory 830 and/or the storage device 860 to the cache 822 for quick access by the processor 820. In this way, the cache provides a performance boost that avoids processor 820 delays while waiting for data. These and other modules may control or be configured to control the processor 820 to perform various actions. Other system memory 830 may be available for use as well. The memory 830 may include multiple different types of memory with different performance characteristics. It may be appreciated that the disclosure may operate on a computing device 100 with more than one processor 820 or on a group or cluster of computing devices networked together to provide greater processing capability. The processor 820 may include any general purpose processor and a hardware module or software module, such as module 1 862, module 2 864, and module 3 866 stored in storage device 860 configured to control the processor 820 as well as a special-purpose processor where software instructions are incorporated into the actual processor design. The processor 820 may be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 100, such as during start-up. The computing device 100 further includes storage devices 860 such as a hard disk drive, a magnetic disk drive, an optical disk drive, tape drive or the like. The storage device 860 may include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules, and other data for the computing device 100. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the communications device 100 is a small, handheld computing device, a desktop computer, or a computer server.

Although the example described herein employs the hard disk 860, it should be appreciated by those skilled in the art that other types of computer readable media that may store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the example operating environment. Non-transitory computer-readable storage media expressly exclude media such as energy, carrier signals, electromagnetic waves, and signals per se.

To enable user interaction with the computing device 100, an input device 890 represents any number of input mechanisms, such as a microphone for speech, a touch-sensitive screen for gesture or graphical input, keyboard, mouse, motion input, speech and so forth. An output device 870 may also be one or more of a number of output mechanisms known to those of skill in the art. In some instances, multimodal systems enable a user to provide multiple types of input to communicate with the computing device 100. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system example is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 840 for storing software performing the operations discussed below, and random access memory (RAM) 850 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 8 may practice all or part of the recited methods, may be a part of the recited systems, and/or may operate according to instructions in the recited non-transitory computer-readable storage media. Such logical operations may be implemented as modules configured to control the processor 820 to perform particular functions according to the programming of the module. For example, FIG. 8 illustrates three modules Mod 1 862, Mod 2 864 and Mod 3 866 which are modules configured to control the processor 820. These modules may be stored on the storage device 860 and loaded into RAM 850 or memory 830 at runtime or may be stored as would be known in the art in other computer-readable memory locations.

Examples within the scope of the present disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM, or other optical disk storage, magnetic disk storage or other magnetic storage devices, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply not only to a smartphone device but also to other devices capable of hands-free input such as a laptop computer. Those skilled in the art will readily recognize various modifications and changes that may be made to the principles described herein without following the example implementations and applications illustrated and described herein, and without departing from the scope of the disclosure.

I claim:

1. A computer-implemented method comprising:
    receiving a numeric input string for dialing a phone number;
    comparing the numeric input string to a database of known phone numbers;
    upon determining, via a processor, that the numeric input string has no match within the database of known phone numbers, identifying a known phone number that is within a threshold similarity to the numeric input string; and
    correcting the numeric input string to correspond to the known phone number.

2. The computer-implemented method of claim 1, wherein the database of known phone numbers comprises one of an address book or a communication log.

3. The computer-implemented method of claim 1, further comprising, prior to correcting the numeric input string:
    prompting a user to confirm the known phone number; and
    receiving, from the user, a confirmation of the known phone number.

4. The computer-implemented method of claim 3, further comprising:
    initiating a communication using the known phone number.

5. The computer-implemented method of claim 1, further comprising, after correcting the numeric input string to yield a corrected numeric input string:
    initiating a communication using the corrected numeric input string.

6. The computer-implemented method of claim 1, wherein the threshold similarity is based on at least one of number transposition, predefined typographical errors, a mistake history, or a keyboard layout.

7. The computer-implemented method of claim 1, wherein comparing the numeric input string to the database of known phone numbers occurs upon complete entry of the numeric input string.

8. A system comprising:
    a processor that communicates with a computer-readable storage medium having instructions stored thereon that, when executed by the processor, cause the processor to:
        receive a numeric input string indicating a numerical address with which to initiate a communication;
        compare the numeric input string to a database of known valid numerical addresses;
        upon determining that the numeric input string has no match within the database of known valid numerical addresses, identify a known valid numerical address that is within a threshold similarity to the numeric input string;
        correct the numeric input string based on the known valid numerical address to yield a corrected numeric input string; and
        initiate a communication using the corrected numeric input string.

9. The system of claim 8, wherein the database of known valid numerical addresses comprises one of an address book or a communication log.

10. The system of claim 8, wherein the instructions, when executed by the processor, further cause the processor to:
    prompt a user to confirm the known valid numerical address; and
    receive, from the user, a confirmation of the known numerical address.

11. The system of claim 8, wherein the threshold similarity is based on at least one of number transposition, predefined typographical errors, a mistake history, or a keyboard layout.

12. The system of claim 8, wherein determining that the numeric input string has no match within the database of known valid numerical addresses comprises:
    determining that the numeric input string is absent from a call history log.

13. The system of claim 8, wherein determining that the numeric input string has no match within the database of known valid numerical addresses comprises:
    determining that the numeric input string is present in a call history log and is indicated as a mistake.

14. The system of claim 8, wherein correcting the numeric input string is further based on the threshold similarity, and further wherein the instructions, when executed by the processor, further cause the processor to:
    upon determining a single known valid numerical address within the threshold similarity, correct the numeric input string based on the single known valid numerical address without additional user interaction.

15. A non-transitory computer-readable storage medium having stored therein instructions which, when executed by an electronic device, cause the electronic device to:
    receive a partial numeric input string indicating a portion of a numerical address with which to initiate a communication;
    compare the partial numeric input string to a database of known valid numerical addresses;
    identify a known valid numerical address having a first portion that is within a threshold similarity to the partial numeric input string; and
    upon determining that no other known valid numerical addresses are within the threshold similarity to the partial numeric input string, initiate a communication using the known valid numerical address.

16. The non-transitory computer-readable storage medium of claim 15, wherein the partial numeric input string is at least a minimum number of digits.

17. The non-transitory computer-readable storage medium of claim 15, wherein the computer-readable storage medium stores further instructions that, when executed by the electronic device, cause the computing device to:
    generate an indication that the known valid numerical address has been identified.

18. The non-transitory computer-readable storage medium of claim 15, wherein the database of known valid numerical addresses comprises one of an address book or a communication log.

19. The non-transitory computer-readable storage medium of claim 15, wherein initiating the communication comprises at least one of placing a telephone call, connecting to a network address, or sending a short messaging service (SMS) message.

20. The non-transitory computer-readable storage medium of claim 15, wherein the computer-readable storage medium stores further instructions that, when executed by the electronic device, cause the computing device to:
 render a dialog to confirm the known valid numerical address; and
 upon receiving a confirmation via the dialog, initiate the communication.

\* \* \* \* \*